United States Patent
Yotsugi

[11] 3,900,697
[45] Aug. 19, 1975

[54] ELECTRIC WIRE INSULATING COVER

[76] Inventor: Masamitsu Yotsugi, No. 1-9, 5-chome Fukata-cho, Naka-ku, Kobe-shi, Hyogo-ken, Japan

[22] Filed: May 2, 1974

[21] Appl. No.: 466,128

[52] U.S. Cl. .................. 174/5 R; 174/136; 174/211
[51] Int. Cl.² .......................................... H01B 17/58
[58] Field of Search ...... 174/5 R, 40 R, 136, 138 R, 174/138 F, 156, 167, 211; 191/35

[56] References Cited
UNITED STATES PATENTS

| | | | |
|---|---|---|---|
| 1,485,994 | 3/1924 | Salisbury | 174/5 R |
| 1,988,435 | 1/1935 | Beebe | 174/5 R |

FOREIGN PATENTS OR APPLICATIONS

| | | | |
|---|---|---|---|
| 124,847 | 3/1928 | Switzerland | 174/5 R |

Primary Examiner—Laramie E. Askin
Attorney, Agent, or Firm—George B. Oujevolk

[57] ABSTRACT

A covering apparatus for insulating electric wires, said covering apparatus being made of material having properties of insulation and formation-flexibility under heat such as synthetic resins, said apparatus comprising a longitudinally-split cylindrical body to hold the electric wire firmly therein and also enabling the cylindrical body to overlap at the terminal portions thereof, and two longitudinal projections extending outwardly therefrom at the terminal portions each of which is situated at a different distance from the split. The two projections under the effect of the inward resilience of the cylindrical body abut one another at the tips but are separated some distance at the portions from which they project so as to form a triangular space between the two projections.

1 Claim, 5 Drawing Figures

PATENTED AUG 19 1975  3,900,697

3,900,697

ELECTRIC WIRE INSULATING COVER

BACKGROUND OF THE INVENTION

The present invention relates to a cylindrical apparatus for insulating high voltage electric wires by means of covering over the wires and more particularly a cylindrical apparatus for insulating high voltage electric wires during a rainstorm.

BRIEF REVIEW OF THE PRIOR ART

Electric insulating covers are conventionally provided on high voltage electric wires particularly when stretched near structures, trees and the like so as to prevent the wires from having a short circuit which may cause accidents such as fire, electric shock, etc., as a result of touching of the wires to structures, trees and the like.

These conventional covers also of cylindrical form, however, are defective since it is not possible to prevent rainwater-infiltration through the break which is provided longitudinally for fitting them over wires.

SUMMARY OF THE INVENTION

Briefly stated, the present invention contemplates employing as wire-covering a cylindrical apparatus so constructed as to prevent the infiltration of rainwater into the cylinder at the opening thereof.

Thus, the first object of the present invention is to provide an electric wire insulating cover capable of preventing the infiltration of rainwater thereinto at the opening thereof, said opening being provided for detachably fitting the apparatus over the wire.

A second object of the present invention is to provide an electric wire insulating cover which can be produced at a low cost.

These objects can be accomplished by the improvement, combination and operation of every part constituting the present invention, the preferred embodiment of which will be described in detail in relation with the annexed drawing in which:

DETAILED DESCRIPTION

Figure 1:
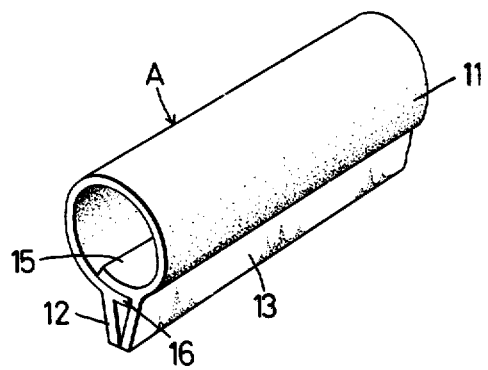
FIG. 1 shows a perspective view of an electric wire insulating apparatus in actual usage.
Figure 3:
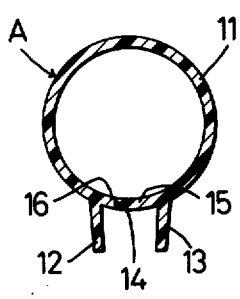
FIG. 3 is a vertical section of the above apparatus immediately after coming out from an extruding machine.
Figure 2:
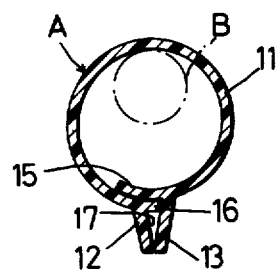
FIG. 2 is a vertical section of the above.

In the embodiment shown in FIGS. 1 to 3, A designates an electric wire insulating apparatus comprising a split cylindrical body 11, and two projections 12 and 13 longitudinally extending outward from the cylindrical body 11 at the outer periphery at the terminal portions 15 and 16 thereof, respectively, terminal portion 16 being narrower than terminal portion 15 as shown in FIG. 1.

The covering apparatus A, made of material which has the properties of insulation and formation-flexibility under heat, such as polyethylene or the like, is produced in the form of a lengthy cylinder with the use of an extruding machine, said lengthy product being cut into several pieces in accordance with the length required for covering a wire.

The cylindrical apparatus A is provided with inward resilience during the process of its manufacture under heated pressing so that the apparatus A has an inward grip so as to hold the wire firmly therein.

The cylindrical body 11 is split lengthwise at break 14 shown in FIG. 3 and is shaped so as to overlap at terminal portions 15 and 16 thereof as shown in FIG. 1, projections 12 and 13 extending outwards from terminal portions 15 and 16. Projections 12 and 13 are situated at different distances from the break 14 so as to form a triangular space between the projections 12 and 13 when the apparatus A takes a cylindrical shape when fitting over an electric wire with said projections 12 and 13 abutting one on the other at both tips thereof, as shown in FIGS. 1 and 2.

The apparatus A is disposed over electric wire B as shown in FIG. 2. The apparatus A can be opened at the break 14 to place it over electric wire B, the inwardly resilient grip of the apparatus A enabling it to firmly maintain the cylindrical form and hold the projections 12 and 13 in side by side abutment at the tips thereof.

Figure 5:
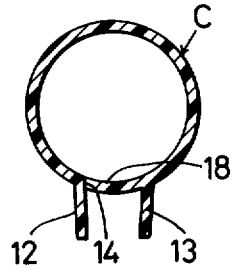
FIG. 5 is a vertical section of the apparatus in FIG. 4 immediately after coming out from an extruding machine.
Figure 4:
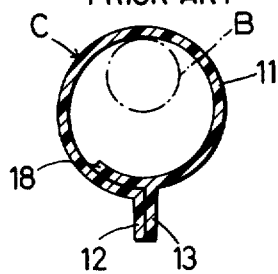
FIG. 4 is a vertical section of a conventional electric wire insulating apparatus in actual usage.

In the case of a conventional electric wire insulating apparatus C shown in FIGS. 4 and 5, one projection 12 extends outward at the break 14 whereas the other projection 13 extends outward at a predetermined distance therefrom, with the result that the projections 12 and 13 inwardly abut on each other at the entire surface thereof which is quite different from the present concept forming a triangular space in between projections 12 and 13.

In a conventional electric wire insulating cover C, rainwater, as it falls dropwise from the joint lower edges of the projections 12 and 13, is likely to flow by capillary action between the projections 12 and 13 thereby allowing rainwater to infiltrate into the cylindrical apparatus, which nullifies the insulating effect of the apparatus.

On the other hand, the electric wire insulating apparatus A in the present invention forms a triangular space between the projections 12 and 13 which prevents the generation of the aforementioned capillary action of rainwater which destroys the insulating effect for this kind of electric wire insulator.

The insulating capacity is compared in various regards between the present concept and conventional apparatus in table 1.

TABLE I

| | | Conventional Apparatus | Present Invention |
|---|---|---|---|
| In dried state | In usual setting | 20,000V/1 minute safety-secured | 25,000V/1 minute safety-secured |
| | In upside-down setting | 10,000V/1 minute safety-secured | 20,000V/1 minute safety-secured |

TABLE I—Continued

|  | | Conventional Apparatus | Present Invention |
|---|---|---|---|
| In water-poured state | In the state of touching with a fresh-verdure tree | 4,000–6,000V causing short-circuit within 1 minute, burning the apparatus and tree | 15,000V/1 minute safety-secured |
|  | In the state of touching with a wooden sign board | 6,000–7,000V causing short-circuit within 1 minute, burning the apparatus and sign board | 16,000V/1 minute safety-secured |

What is claimed is;

1. A covering arrangement for insulating electric wires comprising an elongated inwardly resilient flexible cylindrical body split along its length so as to provide two longitudinal straight edges, sized to hold an electric wire therein, so constructed that the two longitudinal edges overlap, and two straight longitudinal projections extending outwardly from said cylindrical body each situated a different short distance from one of said longitudinal straight edges, said projections touching each other at the outer ends thereof but separated at the inner ends so as to from a triangular space between the two projections.

* * * * *